United States Patent [19] [11] 3,722,480
Berkowitz [45] Mar. 27, 1973

[54] ROTARY COMBUSTION ENGINE WITH IMPROVED FIRING CHANNEL
[75] Inventor: Murray Berkowitz, Woodcliff Lake, N.J.
[73] Assignee: Curtiss-Wright Corporation
[22] Filed: Dec. 20, 1971
[21] Appl. No.: 209,996

[52] U.S. Cl.................................123/8.01, 123/8.09
[51] Int. Cl................................................F02b 77/00
[58] Field of Search................123/169 C, 8.45, 8.09; 418/179

[56] References Cited

UNITED STATES PATENTS 2,560,799  7/1951  Johnson..............................123/32 X
3,512,907  5/1970  Belzner...............................418/113

Primary Examiner—Carlton R. Croyle
Assistant Examiner—Michael Koczo, Jr.
Attorney—Raymond P. Wallace et al.

[57] ABSTRACT

A rotary combustion engine having in its housing an insert coaxial with the spark plug, to define the shape and volume of the spark plug chamber and of the firing channel between the spark plug and the combustion chamber. The insert is formed of material of high heat resistance and high heat conductivity, and is contoured to provide smooth gas flow and to obviate areas of high heat concentration; the insert has its hoop strength relieved to enhance retention in the housing wall.

6 Claims, 4 Drawing Figures

3,722,480

ROTARY COMBUSTION ENGINE WITH IMPROVED FIRING CHANNEL

BACKGROUND OF THE INVENTION

This invention relates to rotary combustion engines of the trochoidal type, with at least one spark plug disposed in a recess in the housing wall with a communicating channel to the combustion chamber.

In this type of engine firing always takes place at the same location, and there is no cooling of the ignition zone by intake of fresh gas. Neither is there alternate firing at other locations as in the conventional reciprocating engine, and the ignition rate of trochoidal engines is usually much higher. Also, since the spark plug cannot enter the combustion chamber but is installed in either the peripheral or end wall, there must be a communicating channel between the spark plug cavity and the combustion chamber, across the orifice of which channel the sealing elements must pass. Fuel and air mixture is driven by engine compression into the spark plug cavity, fired, and a jet of flame is expelled through the firing channel into the combustion chamber proper. This circumstance of operation produces a very high temperature in the firing channel and at its orifice within the combustion chamber, accompanied by very high gas velocity under high pressure through the firing channel. It is difficult to carry away this heat, which on occasion causes cracks and local deformations in the housing wall, particularly at the orifice of the firing channel, owing to thermal stress cycling.

In U.S. Pat. No. 3,512,907 some attempt was made to solve the heat problem by the insertion of a copper plug in the housing wall, with the firing channel running through the copper insert. In one embodiment of the patent wherein the copper insert is a thin sleeve there is not enough copper to provide sufficient heat conductance. In another embodiment wherein the copper is more massive, problems arise of its retention in the housing wall, owing to dissimilar expansion in the two metals. If the interference fit is light, there is the danger of the insert loosening when the engine is cold. If the interference is heavy, the expansion of the insert sets up strains in the housing, owing to its high hoop strength, which may result in cracking or in permanent deformation of either or both the insert and the housing. Neither embodiment makes provision for eliminating temperature peaks at the arrises of the various surfaces of the insert. Further, the "breathing space," or volume of the spark plug cavity between the plug and the insert, is considerable, amounting almost to a precombustion chamber. There is no recognition of the localized heat problem arising from having such a large volume of gas ignited in the spark plug cavity and then discharged through the firing channel. A further problem arises from having a large spark plug cavity. After ignition and when combustion has been initiated in the main combustion chamber, the spark plug cavity is more or less at equilibrium pressure with the main combustion chamber and in effect comprises an extension thereof. When the trailing apex seal, or side gas seal in the case where the spark plug is in a side wall, crosses the orifice of the firing channel the spark plug cavity is suddenly cut off from the expanding chamber, subtracting its volume therefrom and adding it to the following chamber which is still intaking or beginning its compression, depending on the position of the intake port. Thus the gas in the spark plug chamber is lost from the expansion stroke, reducing the efficiency of the engine.

Although the device of U.S. Pat. No. 3,512,907 is satisfactory in engines in which the required heat rejection is not too great and where power losses from lost gas are moderate, for engines in which further development and increased rotor width have resulted in a considerably higher power density and higher heat flux it is necessary to provide a more advanced solution.

SUMMARY OF THE INVENTION

The present invention solves the foregoing problems of the prior art by providing an improved insert for the spark plug cavity. Stresses which would arise between the housing and the insert, by reason of the relative radial spring rates of the insert acting as a ring in compression and the housing as a ring under tension, are relived by removing a controlled amount of the hoop strength of the insert. This provides a spring rate in the insert which insures safe retention with acceptable stress levels in the insert and the housing. The portion of the insert within the spark plug cavity is contoured to nest the nose of the spark plug in a relatively parallel manner with as little clearance as conveniently possible, in order to reduce the breathing volume of the spark plug cavity. The contour of the firing channel through the insert is smoothed to remove the arrises of meeting surfaces to provide a smooth curvilinear path for uniform gas flow, eliminating sharp edges which would result in local high temperature zones. The insert is formed of a material having a coefficient of thermal expansion as near that of the housing as possible compatible with its other properties of retaining its hardness and resistance to corrosion and deformation at high temperatures.

It is therefore an object of this invention to provide a trochoidal rotary engine having an improved firing channel between the spark plug and the combustion chamber.

It is another object to provide a means of reducing the breathing volume of the spark plug cavity.

A further object is to provide for smooth gas flow between the spark plug cavity and the combustion chamber.

Another object is to provide an insert for the spark plug cavity which is retained with acceptable stress levels in the insert and the housing.

These objects and other advantages will be readily understood on reading the following specification in connection with the accompanying drawings.

DESCRIPTION OF A PREFERRED EMBODIMENT

Figure 1:
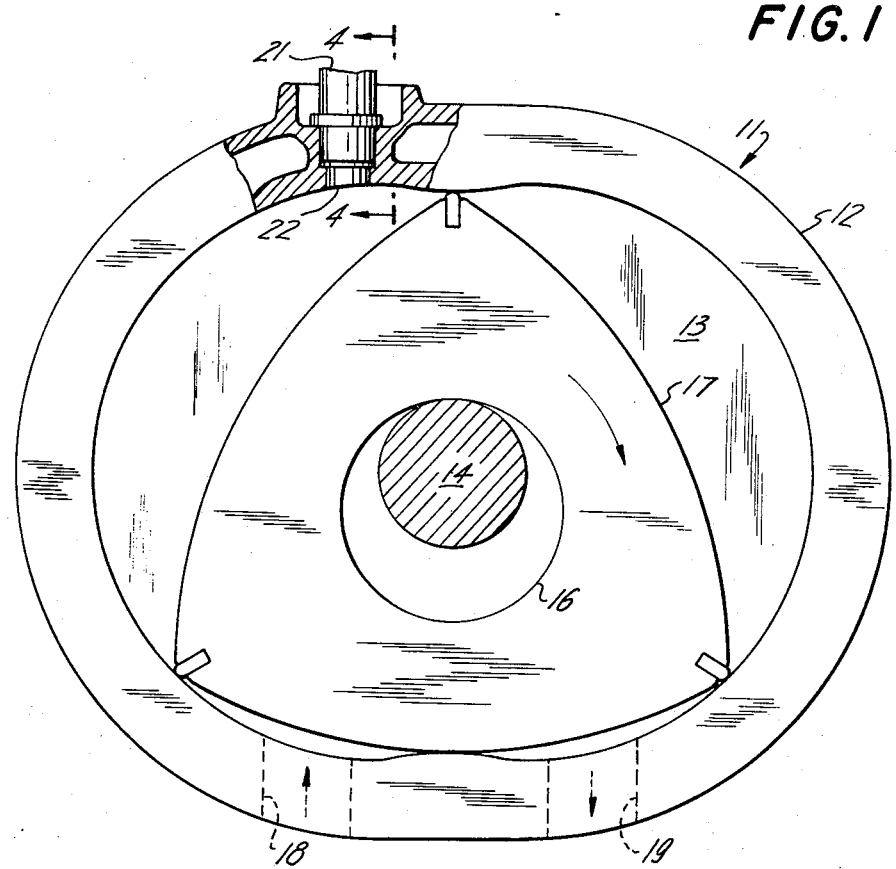
FIG. 1 is an axial profile of a rotary engine with one side wall removed, and the spark plug zone shown in cross-section.

FIG. 1 is an axial profile of a rotary engine 11 with one side wall removed. The engine comprises a peripheral housing 12 of basically epitrochoidal profile spacing apart a pair of parallel side walls, of which only the rearmost wall 13 is shown. A shaft 14 transpierces the side walls and has an eccentric portion 16 within the engine cavity defined by the housing, with a polyarciform rotor 17 rotatably mounted on the eccentric. An intake port 18 and an exhaust port 19 are provided in the housing, shown in this view as extending through the peripheral housing 12, but one or both ports may equivalently be disposed in a side wall. A spark plug 21 is disposed in an appropriate cavity in one of the housing walls, coaxial with an insert member 22 having a channel therethrough communicating with the spark plug cavity and the engine combustion chamber.

Figure 2:
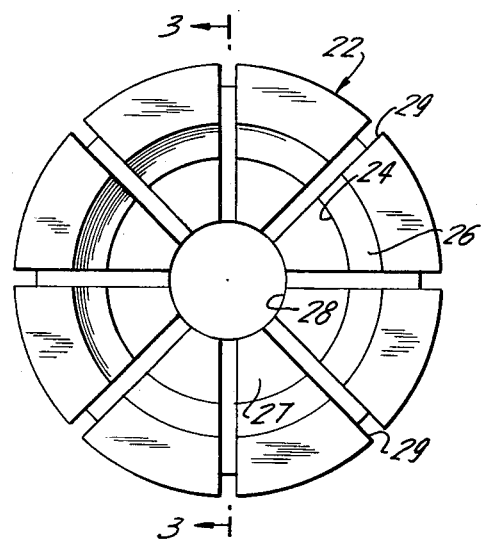
FIG. 2 is a plan view on an enlarged scale of an insert for the spark plug cavity, according to the invention.
Figure 3:
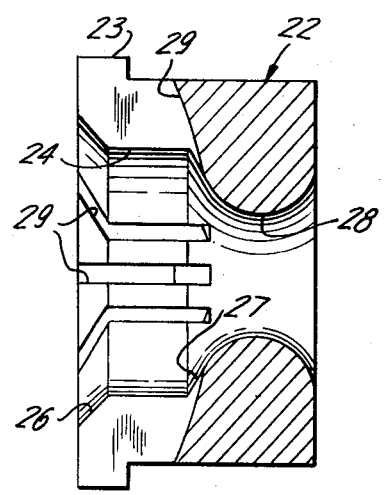
FIG. 3 is a cross-section taken on line 3—3 of FIG. 2.
Figure 4:
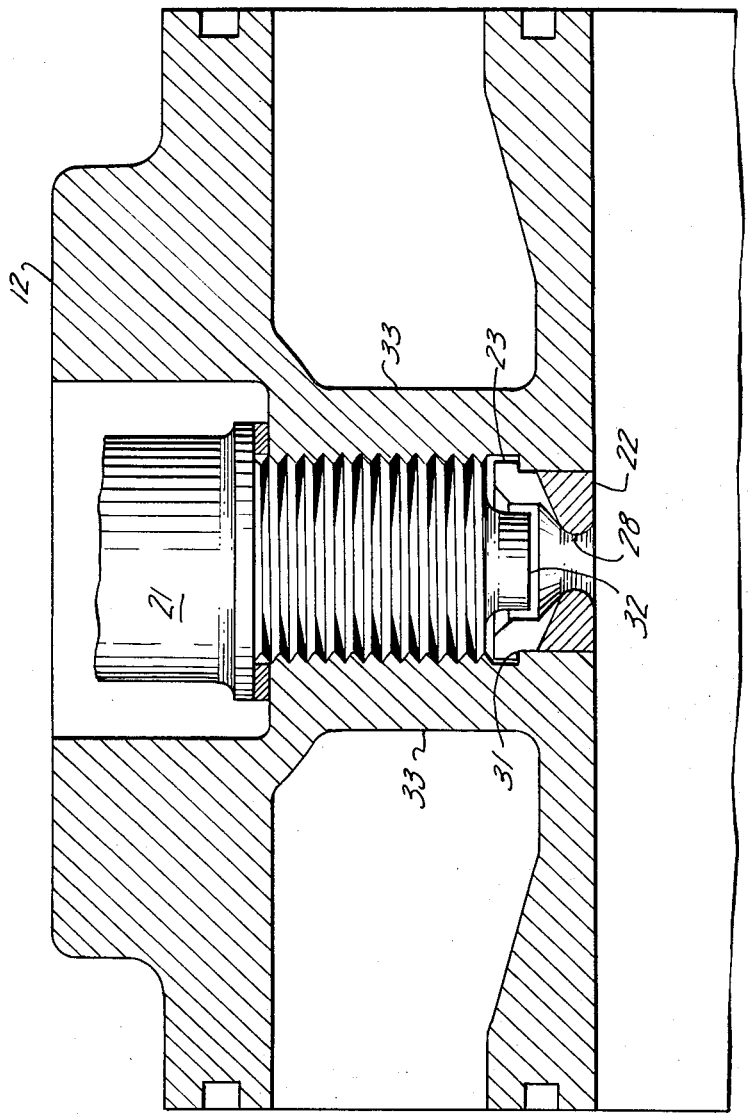
FIG. 4 is an enlarged fragmentary cross-section of the spark plug zone of the engine, taken on line 4—4 of FIG. 1.

FIGS. 2–4 show enlarged views of the insert and of its installation. The insert 22 is generally cylindrical, having a slight flange 23 at the end within the spark plug cavity. A counterbore 24 is provided in the cavity end of the insert, of appropriate diameter and depth to receive the nose of the spark plug 21 in a nesting relationship with only slight clearance. A spark plug of aircraft type is preferred, having no projecting electrodes at its inner end. The end of the counterbore adjacent the spark plug may be chamfered 26 to maintain approximate parallelism and small clearance from the fillet portion of the spark plug where the nose portion joins the main body. The bottom of the counterbore 24 is faired by a funnel-shaped portion 27 into a firing channel hole 28 of smaller diameter through the remainder of the insert. The arrises of the firing channel hole at the orifice end and at the juncture with the funnel portion 27 are rounded off to a smooth curvature, leaving no edges which would disturb gas flow or cause local hot zones.

In order to reduce the hoop strength and lower the spring rate of the insert, the flange end is slit diametrally across with a plurality of slits 29, the slits having a depth of approximately half the axial length of the insert. The slits may be from about 0.010 inch to about 0.050 inch wide, and preferably in the 0.010 inch to 0.015 inch range, in order not to enlarge the breathing volume of the spark plug cavity. Slits 29 may be made levelly across the insert, but more preferably as shown, with a circular cutter of sufficient diameter to emerge at the outer diameter of the insert at a depth from about one-fourth to about one-half the axial length, and at the inner diameter in some portion of the funnel transition portion 27. This procedure leaves the slits with arcuate bottom surfaces leading downwardly toward the firing channel, thus assisting in gas flow.

As shown in FIG. 4, the housing wall is provided with a threaded bore in which is installed a spark plug 21. The spark plug bore has a narrow internal shoulder 31 on which flange 23 of the insert is seated, the insert extending to the inner surface of the housing in interference fit with the housing bore. After assembly the inner end of the insert is finished flush with the inner housing surface in order that the seal members will slide smoothly over it. The nose 32 of the spark plug is nested closely within the counterbore of the insert, with the spark plug surfaces as nearly parallel as possible to the adjacent surfaces of the insert and with only such clearance as is necessary for ready installation, thus restricting the breathing volume of the spark plug cavity as much as possible.

Coolant channels 33 in the housing wall are brought as close as possible to the spark plug cavity. However, there is still a considerable distance between the firing channel and the coolant passages. If the spark plug cavity and the firing channel were formed in the housing itself there would be a large mass of housing metal between the zone where heat is generated and the coolant flow. Common housing materials are aluminum alloys or other light metal alloys, the thermal conductivity of which is not high enough to carry off the extreme heat from the firing channel with sufficient rapidity to eliminate danger of cracking, spalling, or local deformation.

The insert is therefore formed of a metal having high resistance to heat and erosion, thermal expansion as near as possible to that of the housing material, higher heat conductivity than the housing material, and the ability to retain its hardness at high temperatures. Copper is a suitable material for the insert of the present invention, having a coefficient of thermal expansion somewhat lower than aluminum alloys, and thermal conductivity about double that of aluminum alloys. A particularly suitable form of copper for the insert is silver-bearing copper.

Silver is added to copper to increase its resistance to elevated temperatures, raising the point at which softening occurs, and increasing the creep strength and the resistance to stress rupture over long periods of time. The addition of approximately 25 troy ounces of silver per ton of copper raises the softening point of tough pitch copper by about 200°F. With oxygen-free copper this effect is even more pronounced, since oxygen-free copper has in any case a higher softening point than tough pitch copper. An appropriate amount of silver for the copper alloy of the present insert is from approximately 20 troy ounces per ton to approximately 30 troy ounces per ton, with approximately 25 troy ounces being regarded as most suitable.

With an insert of the present design installed in the housing wall as shown in FIG. 4, it will be apparent that practically none of the material of the housing wall is exposed to the high temperatures of the spark plug cavity and the firing channel. The copper insert which is exposed to such temperatures has an outer diameter nearly as large as that of the spark plug, carrying heat rapidly to a location as close as practicable to the coolant channels. The circumference of the insert being in interference contact over most of its surface with the housing wall, the heat is readily transferred to the light metal of the housing alloy, through which it then travels only a minimal distance. The interruption of the hoop of the insert brought about by the plurality of slits allows the insert to yield readily to compression by the housing, since the ratio of elastic deformation to plastic deformation is increased. Even if the yield point of the insert should be exceeded, any permanent deformation of the part will conform readily to the mating part without undue strain, resulting in a self-adjusting fit.

What is claimed is:

1. A rotary combustion engine with external ignition having a housing and a rotor mounted therein for relative rotation, the housing having a smooth inner surface swept by sealing elements carried by the rotor, the housing having in a wall thereof at least one spark plug cavity communicating with the interior of the housing and a spark plug installed in the cavity, wherein the improvement comprises:
  a. an insert having approximately the same outer diameter as the cavity and positioned therein in interference engagement with the housing wall with its inner end flush with the smooth housing surface,
  b. the other end of the insert having therein a counterbore of greater diameter and depth than the nose of the spark plug, the nose of the spark plug being received within the counterbore in a nesting relationship and slightly spaced apart therefrom,
  c. the insert having a firing channel communicating with the counterbore and coaxial therewith and having an orifice at the inner end of the insert, the firing channel being faired into the counterbore of the insert without arrises to provide smooth gas flow therethrough.

2. The combination recited in claim 1, wherein the cavity end of the insert has a plurality of diametral slits thereacross to reduce its hoop strength and to lower the spring rate of the insert.

3. The combination recited in claim 2, wherein the insert has a funnel-shaped transition portion between the counterbore and the firing channel.

4. The combination recited in claim 3, wherein the insert slits have concavely arcuate bottoms emerging at the outer circumference of the insert about one-fourth to one-half the axial length of the insert from its cavity end and emerging at the inner circumference in the funnel-shaped transition portion.

5. The combination recited in claim 2, wherein the insert is formed of copper and has a higher thermal conductivity than the material of the housing.

6. The combination recited in claim 5, wherein the copper material of the insert contains from about 20 troy ounces of silver to about 30 troy ounces of silver per ton of copper.

* * * * *